United States Patent
Fischer et al.

(10) Patent No.: US 9,252,876 B2
(45) Date of Patent: Feb. 2, 2016

(54) HYBRID COMMUNICATION APPARATUS FOR HIGH-RATE DATA TRANSMISSION BETWEEN MOVING AND/OR STATIONARY PLATFORMS

(75) Inventors: Edgar Fischer, Muellheim (CH); Bernhard Wandernoth, Bazenheid (CH); Reinhard Czichy, Eggersriet (CH)

(73) Assignees: SYNOPTA GmbH, Eggersriet (CH); Edgar Fischer, Muellheim (CH); Bernhard Wandernoth, Bazenheid (CH)

( * ) Notice: Subject to any disclaimer, the term of this patent is extended or adjusted under 35 U.S.C. 154(b) by 0 days.

(21) Appl. No.: 13/318,822

(22) PCT Filed: May 6, 2010

(86) PCT No.: PCT/IB2010/052004
§ 371 (c)(1),
(2), (4) Date: Dec. 29, 2011

(87) PCT Pub. No.: WO2010/128478
PCT Pub. Date: Nov. 11, 2010

(65) Prior Publication Data
US 2012/0099868 A1    Apr. 26, 2012

(30) Foreign Application Priority Data
May 6, 2009    (DE) .......................... 10 2009 025 755

(51) Int. Cl.
*H04B 10/00*    (2013.01)
*H04B 10/112*    (2013.01)
*H04B 10/11*    (2013.01)

(52) U.S. Cl.
CPC ............ *H04B 10/1127* (2013.01); *H04B 10/11* (2013.01)

(58) Field of Classification Search
CPC ..... H04B 10/22; H04B 10/1127; H04B 10/11
USPC .......................... 398/115–117, 129, 131, 156
See application file for complete search history.

(56) References Cited

U.S. PATENT DOCUMENTS 3,511,998 A * 5/1970 Smokler .................. G01S 3/42
                                                250/203.3
3,566,126 A * 2/1971 Kenneth ............. H04B 10/1125
                                                359/245
(Continued)

FOREIGN PATENT DOCUMENTS

EP    1 117 197    7/2001
EP    1 370 014    12/2003

OTHER PUBLICATIONS

Wilson et al, Free Space Optical Mimo Transmission with Q aray PPM, Aug. 2005, IEEE Transactions on Communications, vol. 53 No. 8, pp. 1402-1412.*

(Continued)

*Primary Examiner* — Ken Vanderpuye
*Assistant Examiner* — Dibson Sanchez
(74) *Attorney, Agent, or Firm* — Collard & Roe, P.C.

(57) ABSTRACT

The invention relates to a hybrid communication apparatus for high-rate data transmission between moving and/or stationary platforms, comprising at least one transmission and reception device, wherein the transmission engineering used is radio-frequency engineering. The invention provides for light waves to be used for the data transmission either as an alternative or in addition. The transmission and reception devices (2) comprise a radio-frequency transmitter/receiver (9) and a multiplicity of optical transmitters/receivers (10) which are arranged in annular fashion around the radio-frequency transmitter/receiver (9).

6 Claims, 6 Drawing Sheets

(56) References Cited

U.S. PATENT DOCUMENTS

| | | | | |
|---|---|---|---|---|
| 4,005,433 A * | 1/1977 | Tsuda | | 343/819 |
| 4,016,569 A * | 4/1977 | Buebel, Jr. | | 343/703 |
| 4,477,814 A * | 10/1984 | Brumbaugh | H01Q 21/20 | 342/53 |
| 4,904,993 A * | 2/1990 | Sato | | 340/12.5 |
| 4,965,856 A * | 10/1990 | Swanic | H04B 10/00 | 340/555 |
| 4,975,926 A * | 12/1990 | Knapp | | 375/141 |
| 5,327,149 A * | 7/1994 | Kuffer | | 343/720 |
| 5,367,398 A * | 11/1994 | Ito | H04B 10/1125 | 398/121 |
| 5,404,572 A * | 4/1995 | Ishii | | 455/67.14 |
| 5,500,639 A * | 3/1996 | Walley | G08B 25/10 | 340/531 |
| 5,585,953 A * | 12/1996 | Zavrel | | 398/115 |
| 5,594,580 A * | 1/1997 | Sakanaka | H04B 10/1125 | 398/122 |
| 5,777,768 A * | 7/1998 | Korevaar | | 398/129 |
| 5,946,120 A * | 8/1999 | Chen | | 398/155 |
| 5,986,788 A * | 11/1999 | Sasaki et al. | | 398/118 |
| 6,076,939 A * | 6/2000 | Czichy et al. | | 362/253 |
| 6,239,888 B1 * | 5/2001 | Willebrand | | 398/129 |
| 6,307,521 B1 * | 10/2001 | Schindler et al. | | 343/781 CA |
| 6,381,055 B1 * | 4/2002 | Javitt et al. | | 398/131 |
| 6,445,351 B1 * | 9/2002 | Baker et al. | | 343/725 |
| 6,490,066 B1 * | 12/2002 | Korevaar | | 398/128 |
| 6,509,922 B2 * | 1/2003 | Fujita | | 347/236 |
| 6,801,172 B1 * | 10/2004 | Schwengler | | 343/781 CA |
| 6,816,112 B1 * | 11/2004 | Chethik | | 342/357.31 |
| 7,039,320 B1 * | 5/2006 | Mecherle et al. | | 398/128 |
| 7,095,957 B1 * | 8/2006 | Britz et al. | | 398/70 |
| 7,110,678 B2 * | 9/2006 | Willebrand et al. | | 398/115 |
| 7,116,909 B2 * | 10/2006 | Aburakawa | H04B 10/032 | 398/115 |
| 7,174,876 B2 * | 2/2007 | Suzuki et al. | | 123/196 R |
| 7,263,297 B2 * | 8/2007 | Verbana | H04B 10/1121 | 398/164 |
| 7,346,281 B2 * | 3/2008 | Wilcken | H01Q 3/2676 | 398/121 |
| 7,394,988 B1 * | 7/2008 | Johnson | H04B 10/1125 | 398/115 |
| 7,397,988 B2 * | 7/2008 | Vanniasinkam et al. | | 385/37 |
| 7,453,835 B1 * | 11/2008 | Coty et al. | | 370/310 |
| 7,805,078 B1 * | 9/2010 | Gerszberg et al. | | 398/115 |
| 8,019,224 B2 * | 9/2011 | Karaki et al. | | 398/115 |
| 8,111,998 B2 * | 2/2012 | George et al. | | 398/115 |
| 8,526,403 B1 * | 9/2013 | Nadji | H04L 47/12 | 370/338 |
| 2002/0075542 A1 * | 6/2002 | Kumar et al. | | 359/135 |
| 2002/0097468 A1 | 7/2002 | Mecherle et al. | | |
| 2002/0122230 A1 * | 9/2002 | Izadpanah et al. | | 359/145 |
| 2002/0122231 A1 * | 9/2002 | Verbana et al. | | 359/145 |
| 2002/0181444 A1 * | 12/2002 | Acampora | | 370/352 |
| 2003/0228098 A1 * | 12/2003 | Sidorovich | | 385/31 |
| 2004/0033078 A1 | 2/2004 | Kube et al. | | |
| 2004/0062551 A1 | 4/2004 | ElBatt et al. | | |
| 2004/0146296 A1 | 7/2004 | Gerszberg et al. | | |
| 2005/0129407 A1 * | 6/2005 | Coleman | | 398/130 |
| 2005/0243004 A1 * | 11/2005 | White | H04B 10/1127 | 343/753 |
| 2008/0317406 A1 * | 12/2008 | Santori et al. | | 385/24 |
| 2009/0252499 A1 * | 10/2009 | Rotgaizer | | 398/131 |

OTHER PUBLICATIONS

Begley et al, Laser Cross Link Systems and Technology, Aug. 2000, IEEE, pp. 126-132.*
International Search Report of PCT/IB2010/052004, Jul. 9, 2010.

* cited by examiner

HYBRID COMMUNICATION APPARATUS FOR HIGH-RATE DATA TRANSMISSION BETWEEN MOVING AND/OR STATIONARY PLATFORMS

CROSS REFERENCE TO RELATED APPLICATIONS

This application is the National Stage of PCT/IB2010/052004 filed on May 6, 2010, which claims priority under 35 U.S.C. §119 of German Application No. 10 2009 025 755.1 filed on May 6, 2009, the disclosure of which is incorporated by reference. The international application under PCT article 21(2) was not published in English.

SPECIFICATION

The invention relates to data communication, and, in particular, to a technique for implementing high-rate data transmission, particularly using MIMO mode.

BACKGROUND OF THE INVENTION

A multiple-input, multiple-output ([in English:] multiple input, multiple output, MIMO) communication system uses many transmission antennas and many reception antennas for implementation of data transmission. A MIMO channel is formed by the transmission and reception antennas and can be broken down into independent channels. Each of these independent channels is also referred to as a spatial sub-channel or inherent mode of the MIMO channel. Such systems are particularly known from mobile radio technology and are described in EP 1 117 197A2, for example.

MIMO (Multiple Input Multiple Output) refers, in communication technology, to the use of multiple transmission and reception antennas for wireless communication. This is the basis for special coding methods that make use of not only the time dimension, but also the space dimension for data transmission (Space-Time Coding). The principle that is used in MIMO comes from military radar technology, which has already been in use for many years. There, not just one but multiple antennas having the same construction are used. The antennas have a distance of at least half a wavelength (lambda/2) of the carrier frequency from one another. A third dimension is added to the frequency-time matrix that has been usual until now. In this connection, the data signal is transmitted by way of multiple antennas. At the same time, multiple reception antennas are also used. The signal-processing reception unit receives spatial information by means of multiple radio signals. This is because the same radio signal arrives at the receiver from two different directions, at two antennas. Each incoming radio signal generally has its own "spatial fingerprint," which is also called a "spatial signature." The receiver assembles the signals again, in suitable manner. This significantly improves the performance of the entire radio system.

As a result, quality, bit error frequency, and data rate of a wireless connection can be clearly increased. MIMO systems can transmit significantly more bit/s per Hz bandwidth used, and thus have a greater spectral efficiency than conventional SISO or SIMO systems.

The simplest MIMO hardware consists of two transmission antennas and one reception antenna. In order to optimally utilize the performance capacity, antennas are always used in pairs. The MIMO signal processing algorithms are thereby simplified and lead to an optimal signal-to-noise ratio.

The bandwidth can be increased, in linear manner, with the number of transmission antennas. Separation of the individual signals is a simple linear matrix calculation, which is calculated by high-performance processors. If one proceeds from this calculation, then theoretically, the transmission capacity could be increased infinitely. Eight transmission and reception antennas, in each instance, are considered to be the maximum. The advantages of multiple-antenna systems are the following:
  greater reception power (group benefit)
  interference suppression (interference suppression benefit)
  better connection quality (diversity benefit)
  higher transmission rates (multiplex benefit)

High-frequency transmission techniques are used for data transmission, in particular; their wavelengths normally lie at approximately 18 GHz, 30 GHz, and 42 GHz.

However, in order to be able to transmit high-rate data, in general optical transmission is preferred. In order to allow optical data transmission and tolerances in the case of moving transmitters and receivers (platforms), adaptive optics are preferred. However, this embodiment is very cost-intensive and, in particular, sensitive to ambient influences.

A significant advantage of high-frequency transmission lies in that data transmission is possible even under poor weather conditions, particularly at an adaptive data rate. As a result, moving platforms on which transmitters or receivers are disposed can be tracked accordingly. However, the sensitivity to interference is very great, so that—as is known from terrestrial or space communication—it is necessary to make use of a laser communication system.

These optical systems bring the advantage that they are suitable for high-rate data transmission. At a wavelength of 0.5 to 2.2 µm (micrometers), the data transmission is very great; however, it is very dependent on weather conditions, in particular, and other optical influences.

Task of the Invention

It is therefore the task of the invention to make available a data transmission apparatus for high-rate data transmission, which apparatus can particularly be used on moving platforms, on which receiver and transmitter or only one element is disposed in moving manner, accordingly.

Solution of the Task

The solution of the task consists in making available a so-called hybrid terminal, by means of which data transmissions are possible not only by way of high-frequency technology but also by way of optical devices. Preferably, it is provided to use the data transmission by way of the high-frequency device as basic communication, and to add the optical transmission, if the corresponding general conditions permit this, as a so-called "boost."

The data transmissions in the high-frequency range lie between 0.2 Mbps and 100 Mbps; those in the optical range lie between 1 Mbps and 2.4 Gbps.

ADVANTAGES OF THE INVENTION

Optical transmission systems are very cost-intensive because of the adaptive optics, particularly in the case of moving platforms. This means that in order to reach the receiver in the case of at least one moving platform, very great technical efforts are required, in order to allow transmission also over a greater distance (greater than 10 km). According to the invention, it is provided, and this is a significant advantage of the invention, to configure an optical transmission, in addition to the high-frequency transmission, in such a manner that it is designed according to the MIMO process. This means that multiple transmission beams are used, with redundant and interlocked coding, with regard to a multiple receiver. As a result, multiple small beams with multiple receivers are used, a great benefit is obtained as a result of the coding, robustness exists as the result of multiple redundancy, and it must be viewed as a significant advantage that transmitter and receiver structure as such can be structured to be very simple, because they can be produced from usual components that are known from the state of the art. By means of a corresponding compact structure of the apparatus, it is possible to carry out precise tracking, also, for example, using a transmission and/or reception platform on a moving object, for example a ship.

Because of the simplicity of the transmission technique, a hybrid system with very little complexity but great system reliability is formed, whereby not only the high-frequency technique but also the optical technique are used for data transmission.

The invention is designed in such a manner that first, the high-frequency technique is used for transmission of corresponding data over a great distance, particularly in the case of moving platforms, in order to make transmitter(s) and receiver(s) a communication plane available. If the visual conditions (the optical basic prerequisites) allow, then either alternatively or additionally, data transmission by way of light is added, so that the data rate is multiplied. This means that multiple transmitters transmit light waves, using the MIMO process, with many small transmission apertures, and these light waves are received by a plurality of receivers. A corresponding software reconstructs the data in such a manner that even data that do not impact on the receiver, for example, which have been blocked by objects or the like, can be reconstructed.

In order to prevent the data from being unintentionally picked up, particularly in the optical range, it is provided to encrypt or code the individual emitted data. Each individual aperture contains a corresponding coding that is then decoded accordingly by the receivers.

The actual transmitters consist of conventional diode fibers with a corresponding glass-fiber or solid-body amplifier and a transmitter collimator, so that these are directed accordingly at the receiver.

Preferably, the apparatus is also additionally coupled with a GPS satellite transmitter or receiver, so that the position, location, and orientation can be determined, particularly in the case of mobile or moving platforms, and can be transmitted to the receiver by way of the high-frequency transmission, for example.

An exemplary embodiment of such a hybrid communication apparatus for high-rate data transmission is shown in the following description as well as the drawings.

DRAWINGS

These show.

DESCRIPTION OF AN EXEMPLARY EMBODIMENT

Figure 1:
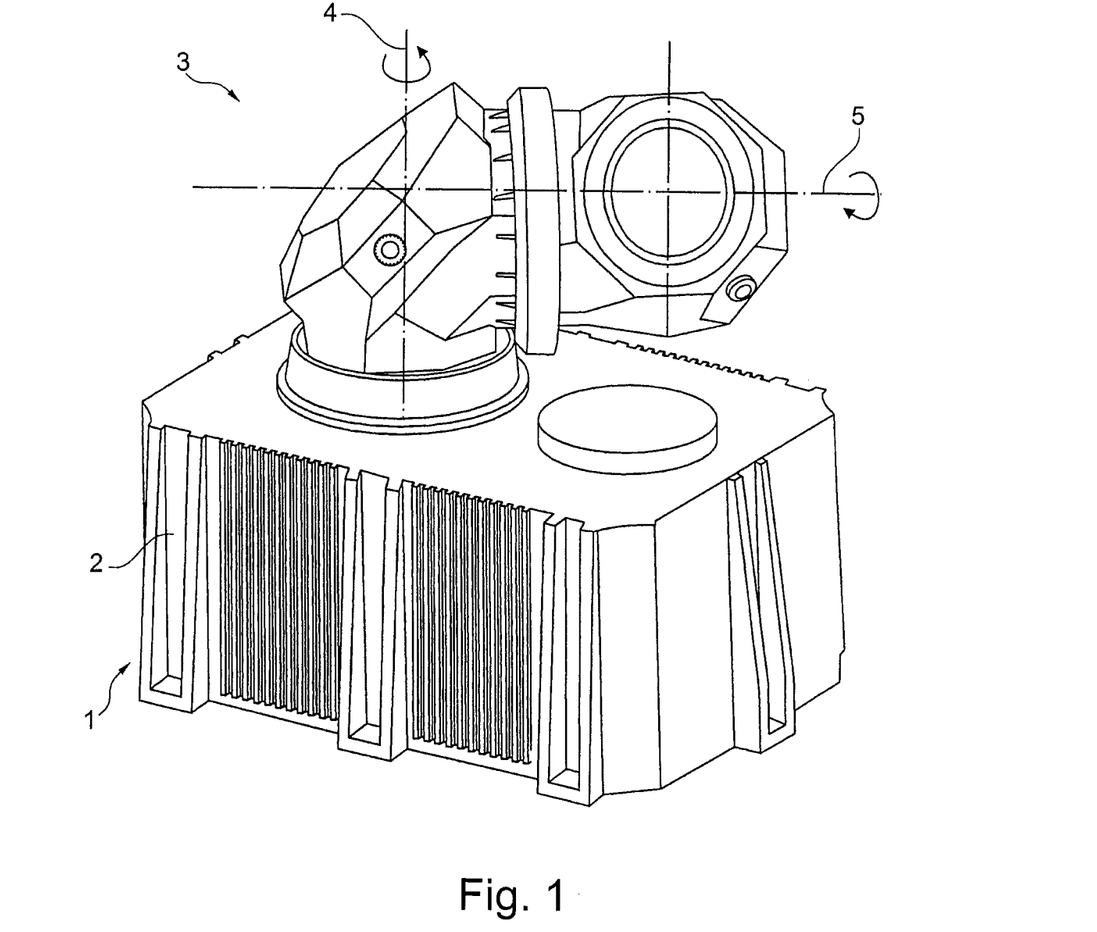
FIG. 1 a perspective view of the hybrid communication apparatus.

In FIG. 1, part of a hybrid communication apparatus 1 is shown. This consists essentially of two elements, namely of a transmission and/or reception unit 2 and a sighting device 3. The sighting device 3 is structured in such a manner that it can be pivoted at least along the axes 4 and 5, respectively. The hybrid communication apparatus 1 is structured in such a manner that it can also be exposed to weather influences, such as rain, snow, ice, or sun.

Figure 2:
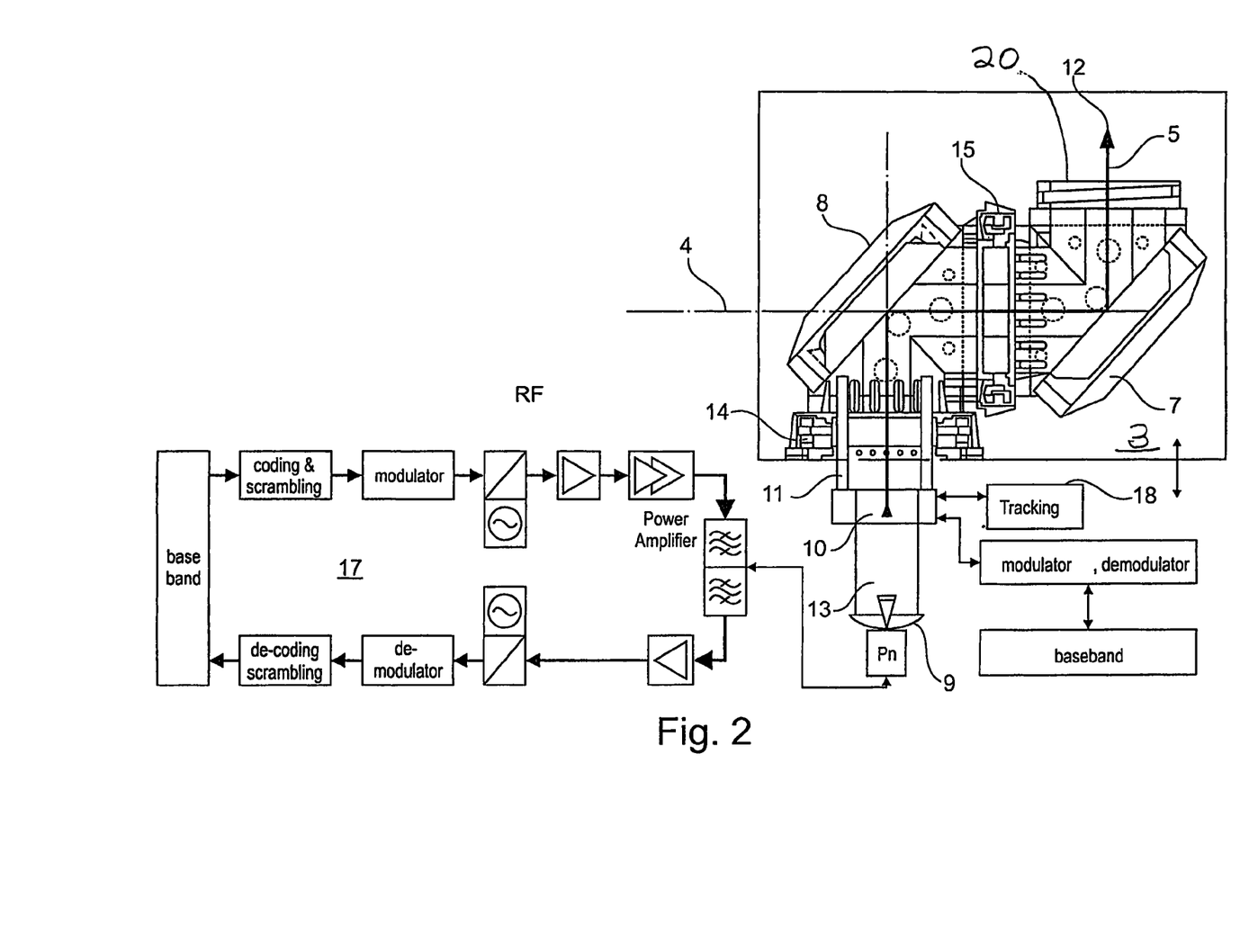
FIG. 2 a schematic representation of the transmission device of the hybrid communication apparatus.

As shown in FIG. 2, the sighting device 3 essentially consists of components such as mirrors 7, 8, which can be pivoted about the axes 4 and 5, respectively. The actual transmission and reception device 2 is disposed within a "black box," so that it is protected from weather influences.

Figure 5:
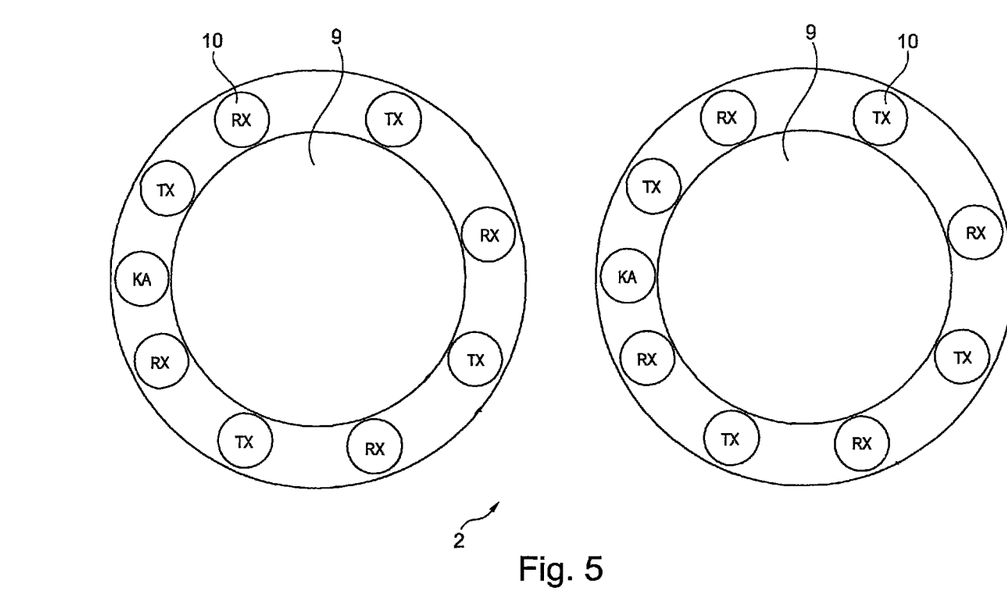
FIG. 5 a schematic representation of the reception and transmission unit of the hybrid communication apparatus.

The transmission and reception device 2, which is also shown schematically in FIG. 5, consists of a high-frequency transmitter/receiver 9 and a plurality of optical transmitters/receivers 10 that are preferably independent of one another, which are disposed in ring shape around the high-frequency transmitter/receiver 9 in the exemplary embodiment shown here. Preferably, the number of transmitters and receivers is the same in the transmission and reception device 2, in each instance.

Alternatively, the possibility also exists of disposing the optical transmitters/receivers 10 differently, for example as an array or a field.

The corresponding emitting beams 11 in the transmission direction are structured in such a manner that they are transmitted in ring shape, by way of the mirrors 7, 8, in the arrow direction 12. The reception light of a remote counter-station, not shown, is received by way of the mirrors 7, 8, opposite the arrow direction 12.

The sub-apertures of the reception optics, disposed around the high-frequency transmitter/receiver 9 in ring shape, finally cut out part of the large received optical beam, and guides the light to the demodulator, by means of glass fibers. The high-frequency radiation 13 is also deflected by way of the mirrors 7, 8, because the mirrors 7, 8 are metal mirrors. Thus, the high-frequency radiation is also emitted in the direction of the arrow 12. The mirrors 7, 8 themselves are pivoted about the axes 4, 5 by way of two actuator motors 14, 15. A corresponding modulation and demodulation unit 17 precedes the transmission device, accordingly. In addition, tracking devices 18 based on GPS or Galileo system receivers or a positioning system having a similar effect and/or an SWIR camera (short-wave infrared) are provided.

The location or the inclination of the platform in 3D space can be determined by an evaluation of differential GPS or Galileo system signals, as can its orientation with regard to the north direction.

Thus, not only the high-frequency transmission technique but also the optical transmission technique makes use of common control or sighting optics. The high-frequency side establishes a corresponding traditional radio link between two fixed points. This is a centrally disposed high-frequency beam. The optics establish a MIMO connection between the corresponding points. This is a light emission disposed concentrically around the high-frequency beam.

Figure 3:
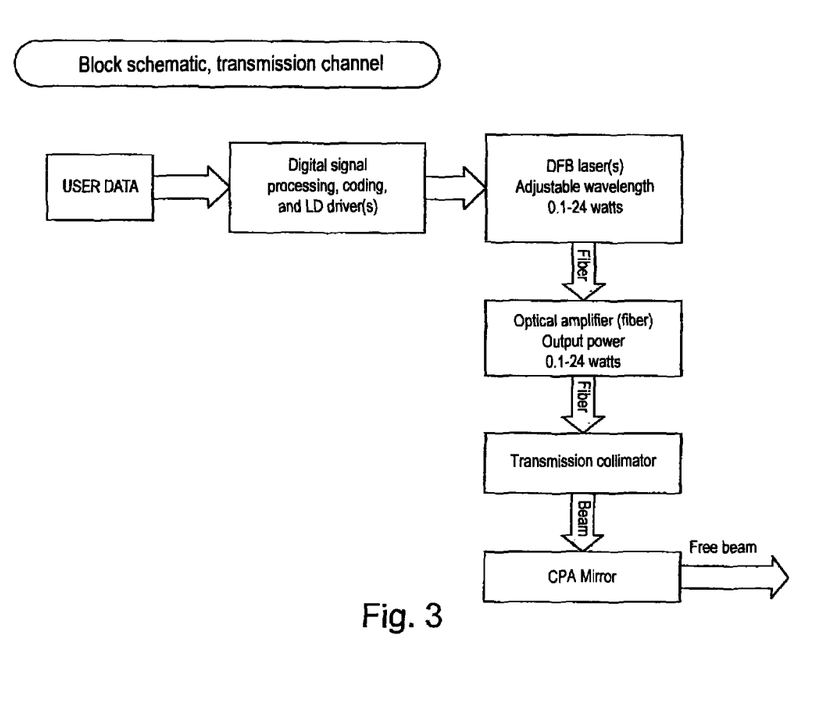
FIG. 3 representation of a block schematic of a transmission channel of the hybrid communication apparatus.

The block schematic of the transmission channel is shown in FIG. 3. Corresponding user data are converted to digital signals, coded, and passed to the diode laser. The signal is transmitted by way of fibers, fiber amplifiers, and a transmission collimator, by way of this mirror, as described above.

Figure 4:
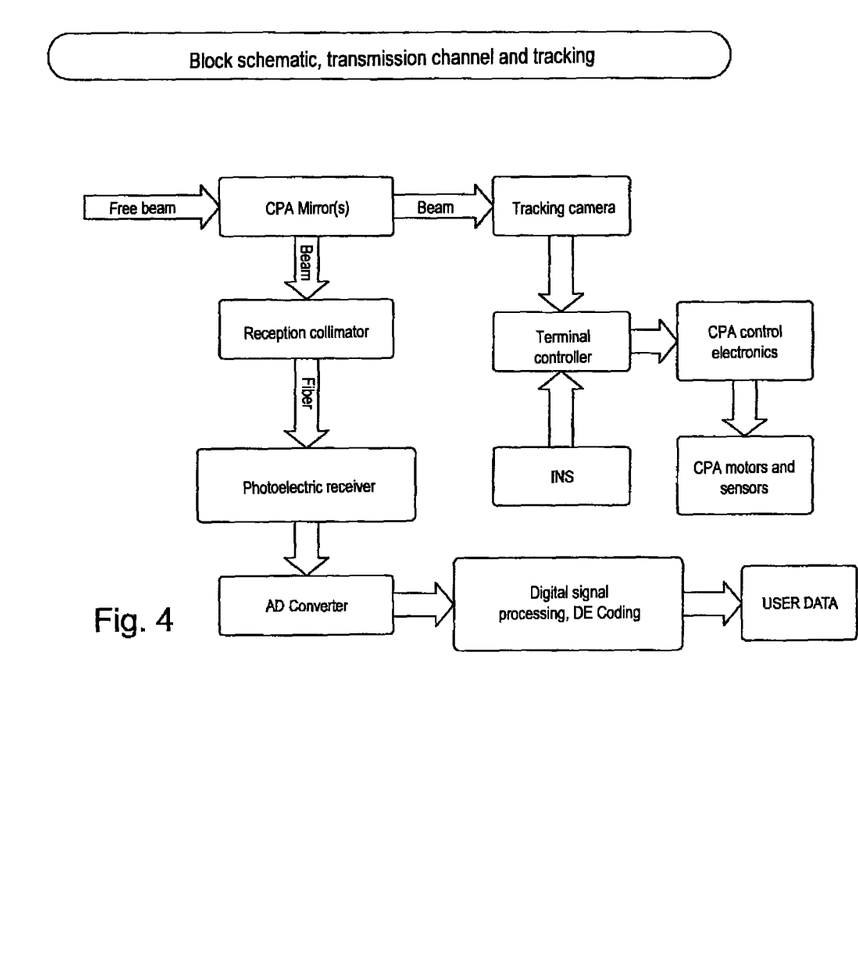
FIG. 4 representation of a block schematic of a reception channel, including corresponding tracking.

According to the block schematic shown in FIG. 4, the corresponding transmitted beam is received and "captured" by way of tracking cameras. A reception collimator as well as photo-electric receivers transfer the received light signals and high-frequency signals, respectively, to an analog/digital converter, which decodes the corresponding data and makes them available again as user data—at a distance from the transmission terminal.

A schematic representation of the reception and transmission unit 2 of the hybrid communication apparatus 1 is shown in FIG. 5. It consists of a high-frequency transmitter/receiver 9 and a plurality of optical transmitters/receivers 10 that are preferably independent of one another, which are disposed in ring shape around the high-frequency transmitter/receiver 9 in the exemplary embodiment shown here. Preferably, the number of transmitters and receivers is the same in the transmission/reception device 2, in each instance. The individual optical transmitters/receivers are divided into TX for transmitters and RX for receivers. Furthermore, special fields are provided (indicated with KA). They serve to transmit or receive special signals for the tracking device 18, for example. Smaller apertures 20 are shown in FIG. 2.

Figure 6:
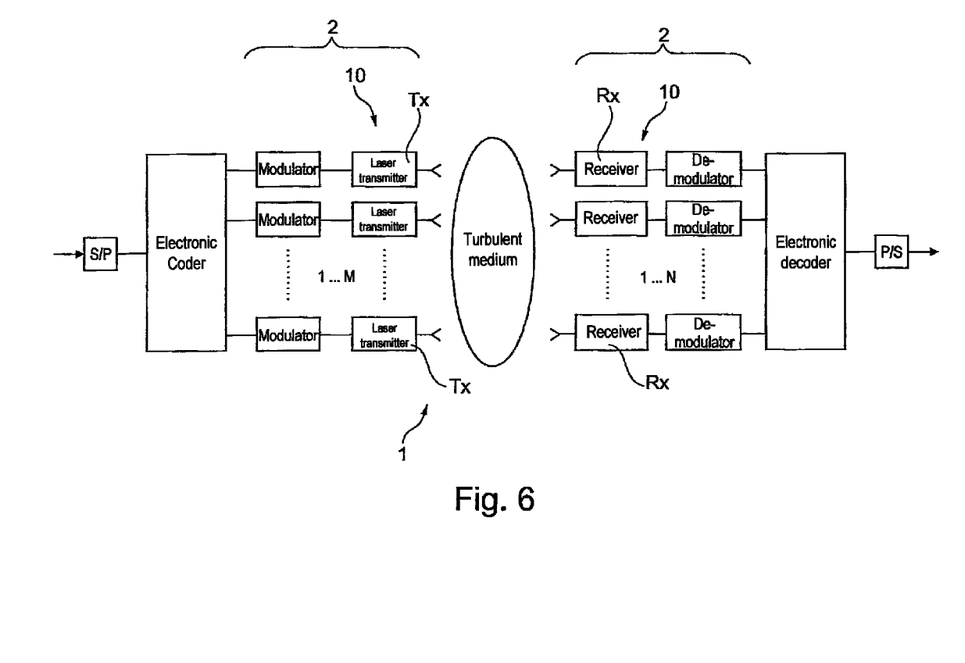
FIG. 6 a representation of a block schematic of the method of functioning of the hybrid communication apparatus.

The optical MIMO transmission is shown schematically in FIG. 6. The simplest MIMO hardware consists of two transmitters (M1, M2) and one receiver (N1). In order to optimally utilize the performance capacity, antennas (transmitters/receivers) are always used in pairs. In this way, the MIMO signal processing algorithms are simplified and lead to an optimal signal-to-noise ratio. The bandwidth can be increased, in linear manner, with the number of transmission antennas. Separation of the individual signals is a simple linear matrix calculation that is calculated by high-performance processors. If one proceeds from this calculation, then theoretically, the transmission capacity could be increased infinitely (1 . . . M, 1 . . . N).

In the case of the signal made available here, coding takes place before the actual modulation. This serves to guarantee data security. Data transmission takes place by way of the transmitters 10 (indicated with TX). The individual receivers (indicated with RX) will receive the signals almost independent of the medium. After demodulation and decoding, the transmitted signal and the data connected with it are available.

Thus, a transmission apparatus has been made available, particularly for high-rate data, by means of which data can be transmitted and received even on moving platforms. An optical data transmission can be added as a "boost," depending on the corresponding environment (for example weather), for high-rate data transmission; this preferably, and also advantageously here, in the present apparatus, uses the same tracking or sighting optics as the high-frequency transmission already described above. In this way, a compact hybrid terminal, particularly one that can be disposed on moving platforms (high-frequency and optical transmission by way of the same sighting device) can be made available, which can even be exposed to weather influences without corresponding adaptive optics being required. The actual transmitters or receivers are disposed outside of the tracking unit, so that they can be disposed at practically any desired points, without being exposed to weather influences.

REFERENCE SYMBOL LIST

Hybrid Communication Apparatus For High-rate Data Transmission Between Moving and/or Stationary Platforms
1. hybrid communication apparatus
2. transmission or reception unit
3. sighting device
4. axes
5. axes
6. -
7. mirror
8. mirror
9. high-frequency transmitter
10. optical transmitter
11. emitting beams
12. arrow direction
13. high-frequency radiation
14. actuator motors
15. actuator motors
16. -
17. modulation and/or demodulation unit
18. tracking devices
TX signal to be transmitted
RX signal to be received
1 . . . M, M1, M2 transmission unit
1 . . . N, N1, N2 reception unit
20. Smaller apertures

The invention claimed is:

1. A hybrid communication apparatus for high-rate data transmission between moving and/or stationary platforms, the hybrid communication apparatus comprising at least one transmission and reception device comprising:
 a high radio frequency transmitter/receiver;
 multiple optical transmitters/receivers that use light waves for optical data transmission; and
 a sighting device for orientation with regard to transmission and reception, the sighting device being structured to be pivoted at least along two axes;
 wherein the multiple optical transmitters/receivers are independent of one another;
 wherein each of the multiple optical transmitters/receivers has an aperture for entry and exit of light waves, the diameter of the aperture being smaller than the diameter of an aperture of the high radio frequency transmitter/receiver;
 wherein the multiple optical transmitters/receivers transmit light waves, using a MIMO process, these light waves being received by a plurality of optical transmitters/receivers;
 wherein the independent optical transmitters/receivers are disposed around the high radio frequency transmitter/receiver; and
 wherein the sighting device is configured to provide common direction control for the high radio frequency transmission and for the optical transmission.

2. The hybrid communication apparatus according to claim 1, wherein the individual optical transmitters/receivers are disposed in the same number and break down into transmitters and receivers.

3. The hybrid communication apparatus according to claim 1, wherein each individual aperture is coded, with reference to the light waves.

4. The hybrid communication apparatus according to claim 1, wherein the at least one transmission and reception device further comprises a tracking device comprising a GPS system or an equivalent positioning system.

5. The hybrid communication apparatus according to claim 1, wherein the at least one transmission and reception device has a transmitting/receiving device with which signals for the sighting device can be transmitted and received.

6. The hybrid communication apparatus according to claim 1, wherein the moving platforms are ships.

* * * * *